March 12, 1940.  G. WALTHER ET AL  2,193,049
TRAILER SUPPORT OPERATING MEANS
Filed July 29, 1938   2 Sheets-Sheet 1

GEORGE WALTHER.
ELMER L. MILLER.
INVENTORS

BY
ATTORNEYS

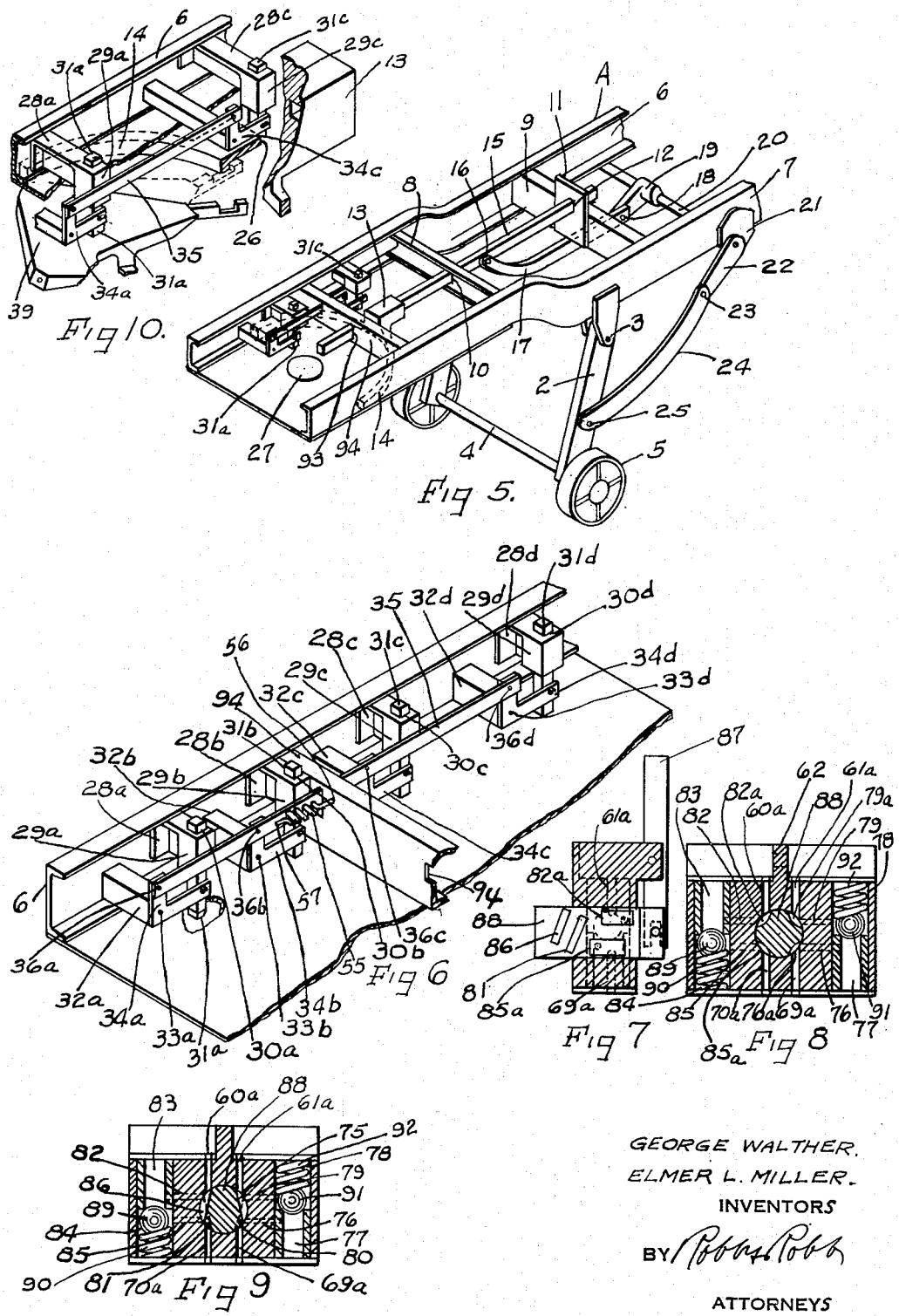

Patented Mar. 12, 1940

2,193,049

UNITED STATES PATENT OFFICE 2,193,049

TRAILER SUPPORT OPERATING MEANS

George Walther, near Dayton, and Elmer L. Miller, Dayton, Ohio, assignors to The Dayton Steel Foundry Company, Dayton, Ohio, a corporation of Ohio Application July 29, 1938, Serial No. 222,044

4 Claims. (Cl. 280—33.1)

In the transportation of goods today the employment of a type of vehicle known as a semi-trailer which is towed in coupled relation with a tractor is becoming more and more prevalent. This semi-trailer type of vehicle ordinarily has rear wheels permanently supporting the rear of the trailer for travel.

The forward portion of the trailer is supported upon the rear portion of the tractor for travel and is provided with retractible front supports adapted to be raised when the trailer vehicle is coupled to the tractor vehicle, or lowered into ground-engaging position when the vehicles are to be uncoupled.

Automatic coupling means comprising fifth wheel parts on the tractor and trailer have been heretofore provided whereby the tractor and trailer may be automatically coupled when the tractor is backed into coupling relation to the trailer. Such ordinary fifth wheel coupling means are shown in patents such as the one to Charles M. Martin, No. 1,412,025, and the Letters Patent of George Walther, et al. No. 2,072,661.

Automatic fifth wheel coupling means of the type illustrated by the aforementioned Letters Patent are widely used at the present and have long been the generally accepted type of coupling means for this purpose.

While employment of fifth wheel means of this type enables coupling of tractor and trailer automatically, it has been heretofore necessary to provide a_.cillary manually operated means by which to raise the trailer front supports out of ground-engaging position for travel of the trailer in coupled relation to the tractor, and to lower said supports into ground-engaging position when the trailer is to be uncoupled from the tractor.

Types of automatic coupling means have been proposed wherein provision is made for automatically accomplishing the raising and lowering of the trailer front supports incident to coupling and uncoupling of the tractor and trailer vehicles. It has been found necessary, however, to entirely re-design the fifth wheel parts to incorporate means for accomplishing this additional function. This necessitates discarding entirely the commonly employed type of coupling means if operation of trailer front supports is accomplished automatically incident to coupling and uncoupling.

Because of wide use of fifth wheels of the type of the aforementioned Letters Patents, it has become a desirable objective to develop a method of utilizing the coupling action thereof to actuate the trailer front supports, to raise and lower the same, without changing the design of said fifth wheels.

It is therefore an important object of the present invention to provide actuating means for raising and lowering the front supports of trailers utilizing the coupling action of the type of fifth wheel of the Letters Patents referred to to accomplish this function without any change in the design of the fifth wheel.

When tractor-trailer combination vehicles of the type referred to are uncoupled, it is desirable that provision be made for setting of the brakes on the trailer so that the latter vehicle will remain stationary when disconnected from the tractor.

It is, therefore, another object of this invention to provide means for automatically setting the trailer brakes simultaneously with the uncoupling operation. The brake setting function is initiated by the same means provided for actuation of the trailer legs.

A further object of this invention resides in the provision for the employment of either fluid pressure operated means or mechanically operated means for accomplishing the purposes above set forth.

A still further object of the invention resides in the provision of a check valve in the fluid-operated system which will permit the fluid to flow in only one direction at a particular time, the direction depending upon whether the supports are being raised or lowered, whereby the trailer front supports may be maintained positively locked either in ground-engaging position or retracted travel position.

An additional object of the invention resides in the provision of safety locking mechanism for maintaining the actuating means continuously in proper position ready for co-action with the coupling means when the vehicles are desired to be coupled, and for insuring positive locking of the supports in raised position during travel of the tractor and trailer vehicles in coupled relation.

Other objects and advantages of the invention will appear more fully as the description thereof progresses.

In the drawings:

Figure 5 is a perspective view of a portion of the trailer frame showing more particularly the actuating means for raising and lowering the trailer supports.

Figure 6 is a perspective view of a portion of the trailer frame showing more in detail the latch mechanism for maintaining the actuating member in its operative and inoperative positions.

Figure 7 is a vertical sectional view of the valve means taken on the line 7—7 of Figure 4.

Figure 8 is a vertical sectional view of the valve means of the modification utilizing fluid pressure taken in a direction at a right angle to the section 9 Figure 7, and showing the valve plunger in condition for permitting fluid flow in a direction to raise the trailer legs.

Figure 9 is a view similar to Figure 8 but showing the valve plunger in for lowering the trailer legs.

Figure 10 is a perspective view, partially broken away, of a portion of the fore-part of the trailer frame and a portion of the tractor fifth wheel showing the manner of engagement of the fifth wheel extension members with the actuating member.

The invention will now be described in reference to the embodiment involving the provision of completely mechanical means for raising and lowering the trailer front supports incident to coupling and uncoupling of the trailer-tractor, and actuation of the trailer brakes to set the same during the latter operation.

Figure 1:
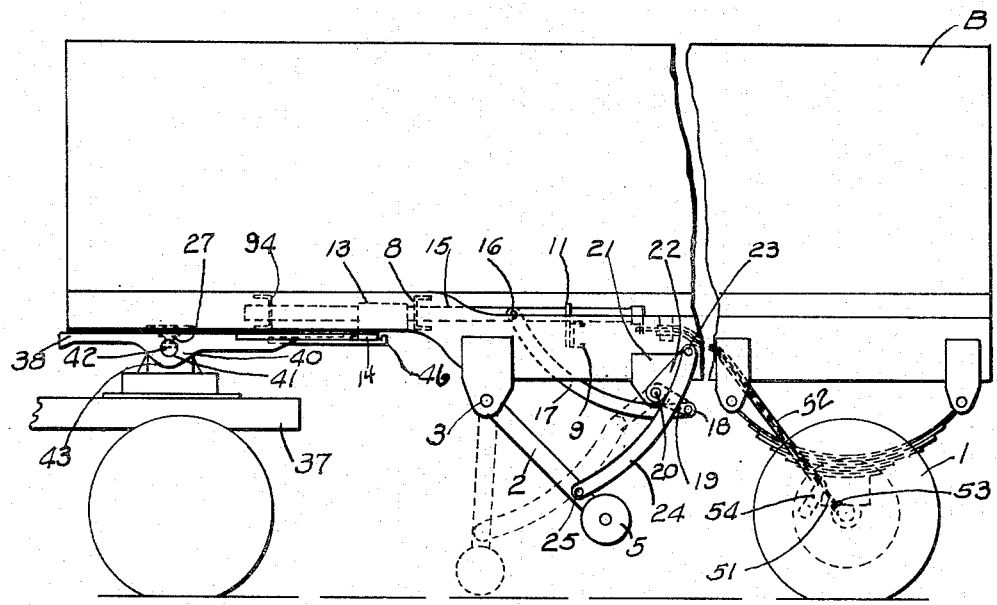
Figure 1 is a side view of a trailer and a portion of the tractor showing the application of my invention thereto.

Referring now particularly to Figures 1 and 5, the letter A designates the chassis frame of a trailer B, which, in this instance, is of the drop frame type. The trailer is provided with rear wheels 1 which support the rear end of the trailer during travel of the trailer when in coupled relation with the tractor.

The trailer is provided with forward supports comprising the legs 2 pivoted at their upper ends, as at 3, to the trailer frame, an axle 4 extending between the legs 2 and upon which are mounted small wheels 5.

Extending between the longitudinal channel members 6 and 7, which comprises the main chassis frame A, are cross members 8 and 9 of channel shape, the member 8 having a passage 10 therethrough and the member 9 being provided with an upstanding bracket 11 also having a passage 12 therethrough. An actuating member 13 provided with a downwardly and horizontally extending arc-shaped flange portion 14 has fixed thereto the actuating rod or bar 15 which extends through the openings 10 and 12 of the cross member 8 and bracket 11 respectively. Said bar 15 extends through the actuating member 13 and through a passage 93 in a cross member 94 forwardly of said member.

Pivotally connected, as at 16, to the rod 15 is a link 17 which is pivotally connected at its opposite end 18 to the lever 19. The lever 19 is fixed to a laterally extending rod 20 to turn therewith, said rod 20 being journaled in bearings 21 secured to opposite sides of the trailer frame A. Outwardly of the bearing 21 the rod 20 has fixed thereto a lever 22 to which is pivotally connected, as at 23, the link 24. At its opposite end link 24 is pivoted to the trailer leg 2, as at 25.

Referring now to Figure 6, the longitudinal channel member 6 of the frame A has suitably attached thereto, and extending inwardly therefrom, the angle brackets 28$^a$, 28$^b$, 28$^c$, and 28$^d$. These brackets are provided with vertically extending portions 29$^a$, 29$^b$, 29$^c$ and 29$^d$, having vertical passages 30$^a$, 30$^b$, 30$^c$ and 30$^d$ through which extend the latch bolts 31$^a$, 31$^b$, 31$^c$ and 31$^d$. Extending horizontally inwardly from the channel member 6, and suitably secured thereto, are the supporting members 32$^a$, 32$^b$, 32$^c$ and 32$^d$.

Pivoted to said supporting members, as at 33$^a$, 33$^b$, 33$^c$, and 33$^d$, are the levers 34$^a$, 34$^b$, 34$^c$ and 34$^d$. A rod or bar 35 is pivotally connected to said levers as at 36$^a$, 36$^b$, 36$^c$ and 36$^d$.

A spring 55, having one end 56 connected to the cross channel member 94, and the other end 57 connected to the rod 35, causes said rod to be normally urged rearwardly maintaining the latch bolts 31$^a$, 31$^b$, 31$^c$ and 31$^d$ in their downwardmost positions. If desired the latches 31$^a$ and 31$^c$ only may be used as shown in Figures 5 and 10. The latches 31$^b$ and 31$^d$ may be provided as an added safety factor.

When the trailer supports are in their downward ground-engaging position, as when the tractor and trailer are uncoupled, the actuating member 13, and its attached rod 15, will be positioned at the limit of their forward movement, longitudinally of the trailer, and maintained in such position by engagement of the latch bolt 31$^c$ behind the shoulder 26 of the flange 14, as best seen in Figure 10.

Pivotally mounted upon the rear portion of the tractor frame 37, as seen in Figure 1, is a fifth wheel member 38, which is the type of the Martin and Walther et al. patents, before mentioned. The details of construction of said fifth wheel member need not be described herein since they form no part of the present invention. Reference is made to the Letters Patents, above identified, for detailed description thereof. It may be stated generally, however, that the fifth wheel member 38, generally comprises a bolster plate 39 provided with opposed bearing portions 40, only one of which is shown, which bearing portions are provided with openings 41 through which a shaft 42 extends, said shaft also extending through pivot arms 43 secured to the tractor frame 37. The fifth wheel member is provided with a V-shaped slot 44, rearwardly thereof, said slot communicating with the central socket 45 in which is provided latch mechanism, not shown.

Figure 2:
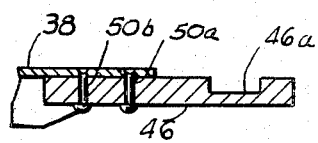
Figure 2 is a vertical sectional view of a portion of the fifth wheel as modified by this invention.

The fifth wheel member is pivoted to the rear of the tractor, by the means above described, in such a manner as to be normally inclined rearwardly. Extension members 46 and 47 are secured to the tail portions 48 and 49 respectively, as seen best in Figure 2, by the rivets 50$^a$ and 50$^b$ extending through said extension members and the tail portions of the fifth wheel. These extension members 46 and 47 are notched, as at 46$^a$ and 47$^a$, for cooperation with the arc-shaped flange 14 of the actuating member 13 in a manner to be hereinafter described.

A cable 51 is secured to the rear end of the actuating rod 15, and said cable extends through the hollow tubing 52 secured to the trailer frame and passes through an opening in the brake actuating lever 54. At the lower extremity of the cable there is secured an abutment member 53 which is sufficiently large that it will not pass through the aforementioned opening in the brake actuating lever 54.

Operation of the completely mechanical trailer support operating means

Assuming that the tractor and trailer are disconnected, the trailer will be forwardly supported, with the legs 2 downwardly extending, so that the wheels 5 are in ground-engaging position, as shown in Figure 5, and by the dotted line position of the supports indicated in Figure 1.

The fifth wheel member 38 on the tractor, which, as above stated, is normally inclined rearwardly when the tractor is disconnected from the trailer will be caused to assume a horizontal position by contact of the forward part of the trailer therewith when the tractor backs into coupling relation with the trailer. Leveling of the fifth wheel member will cause the extension members 46 and 47 to engage the arc-shaped flange member 14 so that said flange is seated in the grooves 46ª and 47ª.

Simultaneously with the leveling of the fifth wheel, the bolster plate 39 will engage the latch bolt 31ª and/or 31ᵇ, moving the same upwardly causing latch bolt 31ᶜ, through movement of the bar 35, to move out of engagement with the shoulder 26 of the flange 14, enabling free movement of the actuating member 13 rearwardly.

Figure 3:
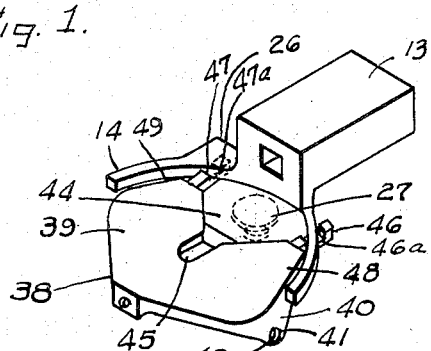
Figure 3 shows the manner of cooperation of the actuating member of the invention with the fifth wheel member.

At the moment that the fifth wheel member becomes leveled, and the extensions 46 and 47 engage the flange 14, the king pin member 27, downwardly extending from the trailer, will be positioned within the confines of the V-shaped slot 44. The position of the king pin member 27 at this time is indicated in Figure 3. The tractor must, therefore, move further rearwardly in order for the king pin to become seated in the socket 45 at which time the king pin will be locked in coupled relation with the fifth wheel member by the fifth wheel latch mechanism afore-mentioned. This further rearward movement of the tractor, after engagement of the extensions 46 and 47 with the flange member 14, causes the actuating member 13 to be moved rearwardly, actuating the lever 19 through the pivoted link 17. Such actuation causes the lever 19 to rotate the rod 20, and consequently the lever 22, in a counterclockwise direction, moving the trailer legs 2 upwardly as a result of the lever 22 actuating the link 24.

During travel of the tractor and trailer vehicle, while in coupled relation, the tractor vehicle may turn with respect to the trailer by reason of the fact that the fifth wheel is pivotally turnable respecting the trailer about the vertical axis of the king pin locked in the socket 45. As the tractor turns respecting the trailer, during travel of the vehicles in coupled relation, the fifth wheel member 38 will turn about the vertical axis of the king pin and the extensions 46 and 47 will move along the arc of the flange 14 which is always maintained engaged in the grooves 46ª and 47ª of said extensions. Should it occur, however, in the travel of the vehicles in coupled relation, that the tractor should turn so far in one direction or the other as to cause the extensions 46 and 47 to become disengaged from the flange 14, the actuating member 13 will be prevented from moving forwardly by engagement of one of the latch bolts 31 in front of the flange 14. It is, therefore, to be seen that any unauthorized downward movement of the trailer supports, during travel of the vehicles in coupled relation, will be prevented.

During the uncoupling of the tractor and trailer, the actuating member 13 is moved forwardly and the trailer supports caused to assume ground-engaging position through actuation of the linkage connection by the said actuating member 13 in a reverse direction. Additionally, however, during the uncoupling operation, the cable or brake actuating member 51 is drawn upwardly through the hollow tubing 52 by reason of the forward movement of rod 15 so that the abutment member 53 engages the brake actuating lever 54 to move the same and thus set the brakes in the rear wheels 1 of the trailer. As the tractor pulls away from the trailer, the fifth wheel 38 will again incline rearwardly, out of engagement with the latch bolts 31ª and/or 31ᵇ, permitting the latch bolt 31ᶜ to drop downwardly behind the shoulder 26 of actuating member 13, locking the same in its forward position.

Description of fluid pressure support operating means

Figure 4:
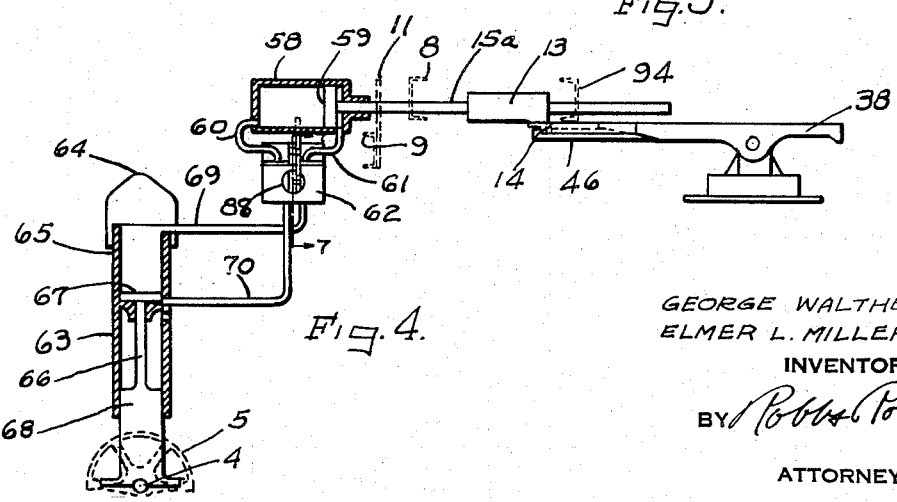
Figure 4 shows a modification of the invention by which fluid pressure is utilized to actuate the trailer supports.

The invention will now be described in connection with a modification thereof, whereby fluid pressure operated means is utilized to raise and lower the trailer supports, upon actuation thereof, during coupling and uncoupling of the tractor and trailer vehicles. The modified construction is illustrated in Figure 4 which shows the interconnection of certain of the parts heretofore described with the fluid-operated means. No further description of those parts, utilized in the modified construction, which have heretofore been described, will be given, but it may be noted that such parts are designated by the same reference characters previously applied thereto.

The actuating member 13, including its arc-shaped flange portion 14, has associated with it the rod or bar 15ª in lieu of the rod 15 in the previously described construction. The rod 15ª constitutes a plunger member mounted for reciprocal movement through the passages 10 and 12 of the cross member 8 and bracket 11, and extends into a fluid-pressure cylinder 58 where it is attached to a piston 59 reciprocable in said cylinder. The cylinder 58 is provided with outlet pipes 60 and 61 leading to a valve 62.

In this construction, instead of the pivoted legs 2, there are provided legs 63, only one of which is shown, comprising a bracket 64 rigidly secured to the trailer frame, in any suitable manner, and a hollow cylindrical portion 65 in which is reciprocably mounted a piston 66 comprising enlarged head portions 67 and 68, the latter of which extends exteriorly downwardly from the cylinder 65 and carries the axle 4, on the lower end thereof, upon which are carried the wheels 5.

Leading from the valve 62 to the upper portion of the cylinder 65 is a pipe 69, and also leading from said valve 62, and communicating with the cylinder 65 at a point midway the length of the latter, is a pipe 70. The fluid pressure system comprising the cylinder 58, pipes 60 and 61, valve 62, pipes 69 and 70 and cylinder 65 may be provided to operate with a suitable liquid medium, or air, or vacuum, as desired.

Details of valve 62 are shown in Figures 7, 8 and 9, wherein it will be seen that the same comprises a housing, previously designated 62, formed with a central cylindrical passages in which is reciprocably mounted a plunger 88 adapted to be actuated for reciprocation by a lever 87. The cylindrical plunger 88 is formed with recesses 76ª, 79ª, 82ª and 85ª adapted to register with ports, or passages, 69ª, 76, 79, 61ª, 60ª, 82, 85 and 70ª, when the plunger has been reciprocated to one of its positions by actuation of the lever 87. The plunger 88 is provided with other recesses 75, 80, 81 and 86, which recesses are adapted to register with the ports or passages, just above designated, when the plunger 88 is reciprocated to another position by actuation of the lever 87. The passages 60ª and 61ª communicate with the pipes 60 and 61 respectively. The passages 70ª and 69ª communicate with the pipes 70 and 69 respectively. The passages 82 and 85 communicate with chambers 83 and 84 respectively; and the passages 76 and 79 communicate with the chambers 77 and 78 respectively. Ball valves 89 and 91 are normally seated in the openings between chambers 83 and 84 and 77 and 78 by reason of springs 90 and 92.

It will be understood that when the fluid operated means of Figure 4 is employed, the cable 51, instead of being secured to rod 15 at its rear extremity as described in connection with the completely mechanical modification of the invention, will be secured to said rod 15 at such a point thereon as never passes beyond the plate 11 in one direction or the forward extremity of cylinder 58 in the other direction.

Assuming that a fluid medium has been supplied to the system, the operation thereof may be described as follows: Assuming that the tractor and trailer are disconnected, and the trailer front supporting members 5 are in ground-engaging position, with the piston 66, positioned at the limit of its downward movement, as shown in Figure 4, backing of the tractor into coupling relation with the trailer will cause the fifth wheel 38 to be leveled, as previously described, and the extensions 46 and 47 to engage the flange 14.

The lever 87 having been set in the position shown in Figure 7 to position the valve plunger 88, in the manner indicated in Figure 8, further rearward movement of the tractor respecting the trailer will cause the actuating member 13, plunger rod 15ª, and piston 59 to be moved rearwardly, or in a leftward direction, respecting Figure 4. This causes the fluid rearwardly of the piston 59 in the cylinder 58 to be forced through the pipe 60, through the passage 60ª in the valve box 62, through recess 82ª into passage 82 into chamber 83. Pressure of fluid in chamber 83 will move ball valve 89 against the pressure of spring 90 to permit fluid to flow into chamber 84, thence through passage 85, recess 85ª, passage 70ª, into pipe 70 and from the latter into cylinder 65.

The pressure in cylinder 65, below the piston head 67, will cause the piston 66 to move upwardly, raising the trailer wheels 5 out of ground-engaging position. As the piston 66 moves upwardly, fluid in the cylinder 65, above the head 67, will be forced into pipe 69, thence into passage 69ª of the valve box 62, through recess 76ª of plunger 88, into passage 76 and thence into chamber 77. Pressure of fluid in chamber 77 will raise ball valve 91 against the pressure of spring 92, permitting fluid to enter chamber 78. From there fluid will flow through passage 79, through recess 79ª of plunger 88, into passage 61ª and thence through pipe 61 into cylinder 58.

It will be seen from the above description that when the valve plunger 88 is in position, as shown in Figure 8, the flow of fluid can only be in the direction just described, since the ball valves 89 and 91 act as check valves to prevent the return of fluid in an opposite direction.

Thus, in the course of actuation of the trailer legs, by fluid pressure in the manner just described, to raise said legs, the same will be maintained in any position which they have attained upon cessation of movement of the rod 15ª. In normal operation, during coupling of the tractor and trailer, the plunger 15ª will be moved rearwardly, or in a leftward direction, with reference to Figure 4, until the piston 59 reaches the limit of its leftward stroke, at which time the piston 66 will be fully raised.

When it is desired to uncouple the tractor from the trailer, the lever 87 will be actuated to move the plunger 88 to the position indicated in Figure 9. Thereupon, during the uncoupling operation in which the tractor moves away from the trailer, the actuating member 13, plunger rod 15ª and piston 59 will be caused to move forwardly, or in a rightward direction, respecting Figure 4. This will cause fluid in the cylinder 58, in front of, or to the right of, piston 59 to be forced into pipe 61, through passage 61ª of valve box 62, through recess 75 of plunger 88, into passage 76 and from there into chamber 77, causing ball valve 91 to move upwardly against the pressure of spring 92, permitting fluid to pass into chamber 78, thence through passage 79, recess 80, passage 69ª, into pipe 69 and from there into cylinder 65.

The pressure of fluid in cylinder 65, above the head 67, will now cause piston 66 to move downwardly, bringing the wheels 5 into ground-engaging position. As the piston 66 moves downwardly, fluid below the head 67, will be forced through pipe 70, into passage 70ª of valve box 62, through recess 81 and passage 82 into chamber 83.

This will move ball valve 89 downwardly against the pressure of spring 90 permitting fluid to flow into chamber 84, from there through passage 85 and recess 86 into passage 60ª and from the latter through pipe 60 into cylinder 58.

It will be seen that with the plunger 88 positioned, as shown in Figure 9, that fluid will be permitted only to flow in the direction just described, because of the operation of ball valves 89 and 91 to check any return flow of fluid. Thus, the trailer support will be positively maintained in ground-engaging position.

It will be noted that while the constructions of trailer support actuating means herein described are particularly adaptable for use in tractor-trailer combinations wherein the rocking fifth wheel is mounted on the tractor and the king pin is mounted on the trailer, the utility of such constructions are not limited thereto.

Having thus described our invention, what we claim as new and desire to secure by Letters Patent of the United States is:

1. In tractor-trailer combination vehicle constructions, in combination, a trailer, a king pin on the trailer, rear supporting wheels therefor, an upwardly and downwardly movable support for the front of the trailer shiftable up to an inactive position for ordinary travel movement of the tractor and trailer in coupled relation, and shiftable downwardly to support the trailer at its front end when the latter is uncoupled from its tractor vehicle, an actuating member movable forwardly and rearwardly on the trailer and connected to said front support, a tilting fifth wheel for coupling to the king pin of the trailer, said fifth wheel having interlocking means thereon movable incident to the upward tilting of the fifth wheel to interengage said actuating member for establishing connection therewith to enable movement of the same to raise said front support, said interlocking means disengaging from the actuating member on downward tilting of the fifth wheel.

2. Vehicle means and mechanism as claimed in claim 1, in which the interlocking means comprises extensions fixed to the rear end portion of the fifth wheel, combined with an arc-shaped portion on the actuating member to interengage the said extensions when the rear end of the fifth wheel tilts upwards in a tractor-trailer coupling action, whereby the fifth wheel may shift the actuating member while interlocked therewith.

3. Vehicle means as claimed in claim 1, in which the interlocking means connects the fifth wheel and actuating member for actuation of the latter forwardly and rearwardly to lower and raise, respectively, the front support, the interlocking means comprising parts having laterally extended contact relation maintaining their connection during pivoting movement of the trailer about the axis of its king pin.

4. Vehicle means and mechanism as claimed in claim 1, in which the interlocking means comprises extensions fixed to the rear end portion of the fifth wheel, combined with an arc-shaped portion on the actuating member to interengage the said extensions when the rear end of the fifth wheel tilts upwards in a tractor-trailer coupling action, whereby the fifth wheel may shift the actuating member while interlocked therewith, and locking means on the trailer operable by the tilting fifth wheel in its opposite tilting movements to engage and disengage the actuating member, to hold the latter from movement along with the front support, and permit movement of the actuating member along with the front support, respectively.

GEORGE WALTHER.
ELMER L. MILLER.